US007980849B2

(12) United States Patent
Strobel et al.

(10) Patent No.: US 7,980,849 B2
(45) **Date of Patent: *Jul. 19, 2011**

(54) APPARATUS AND METHOD FOR FLAME-PERFORATING FILMS

(75) Inventors: Mark A. Strobel, Maplewood, MN (US); Michael J. Ulsh, Woodbury, MN (US); Joel A. Getschel, Osceola, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/702,907

(22) Filed: Feb. 9, 2010

(65) Prior Publication Data

US 2010/0140826 A1 Jun. 10, 2010

Related U.S. Application Data

(62) Division of application No. 11/343,766, filed on Jan. 31, 2006, now Pat. No. 7,686,996, which is a division of application No. 10/267,538, filed on Oct. 9, 2002, now Pat. No. 7,037,100.

(51) Int. Cl.
*B29D 7/01* (2006.01)

(52) U.S. Cl. ................ 425/471; 425/DIG. 37; 425/290; 264/80

(58) Field of Classification Search .................... 264/80; 425/290, 471, DIG. 37
See application file for complete search history.

(56) References Cited

U.S. PATENT DOCUMENTS

| | | | |
|---|---|---|---|
| 3,012,918 | A | 12/1961 | Schaar |
| 3,038,198 | A | 6/1962 | Schaar |
| 3,145,242 | A | 8/1964 | Bryan |
| 3,146,283 | A | 8/1964 | Da Valle |
| 3,153,684 | A | 10/1964 | Bryan |
| 3,394,211 | A | 7/1968 | MacDuff |
| 3,431,135 | A | 3/1969 | Keane et al. |
| 3,900,538 | A | 8/1975 | Kawakami et al. |
| 3,985,600 | A | 10/1976 | Blais |
| 4,151,240 | A | 4/1979 | Lucas et al. |
| 4,217,327 | A | 8/1980 | Cancio et al. |

(Continued)

FOREIGN PATENT DOCUMENTS

EP 0 000 387 1/1979

(Continued)

OTHER PUBLICATIONS

Strobel et al., *Flame Surface Modification of Polypropylene Flim*, Journal of Adhesion Science Technology, vol. 10, No. 6, pp. 515-539 (1996).

*Primary Examiner* — Yogendra N Gupta
*Assistant Examiner* — Alison Hindenlang
(74) *Attorney, Agent, or Firm* — Kenneth B. Wood

(57) ABSTRACT

An apparatus and methods for flame-perforating films. A preferred embodiment of the apparatus includes a frame, support surface attached to the frame, where the support surface includes a plurality of lowered portions, a burner attached to the frame opposite the support surface, where the burner supports a flame, and where the flame includes a flame tip opposite the burner and a film contacting the support surface, where the flame of the burner is in contact with the film, where the burner is positioned such that the distance between an unimpinged flame tip of the flame and the burner is at least one-third greater than the distance between the film and the burner.

7 Claims, 6 Drawing Sheets

U.S. PATENT DOCUMENTS

| | | | | |
|---|---|---|---|---|
| 4,248,822 | A | 2/1981 | Schmidt | |
| 4,272,473 | A | 6/1981 | Riemersma et al. | |
| 4,303,609 | A | 12/1981 | Hureau et al. | |
| 4,451,533 | A | 5/1984 | Wong et al. | |
| 4,552,709 | A | 11/1985 | Koger, II et al. | |
| 4,581,087 | A | 4/1986 | Johnson | |
| 4,978,486 | A | 12/1990 | Ito et al. | |
| 5,051,225 | A | 9/1991 | Hommes et al. | |
| 5,072,493 | A | 12/1991 | Hommes et al. | |
| 5,141,795 | A | 8/1992 | Kal et al. | |
| 5,202,077 | A | 4/1993 | Marco et al. | |
| 5,536,555 | A | 7/1996 | Zelazoski et al. | |
| 5,637,368 | A | 6/1997 | Cadalbert et al. | |
| 5,674,581 | A | 10/1997 | Marco et al. | |
| 5,830,555 | A | 11/1998 | Srinlvasan et al. | |
| 5,891,967 | A | 4/1999 | Strobel et al. | |
| 5,900,317 | A | 5/1999 | Strobel et al. | |
| 6,635,334 | B1 | 10/2003 | Jackson et al. | |
| 7,037,100 | B2 * | 5/2006 | Strobel et al. | 425/290 |
| 7,160,095 | B2 * | 1/2007 | Getschel et al. | 425/290 |
| 7,402,033 | B2 * | 7/2008 | Getschel et al. | 425/290 |

FOREIGN PATENT DOCUMENTS

| | | | |
|---|---|---|---|
| EP | 0 976 529 | | 2/2000 |
| EP | 1 033 324 | A1 | 9/2000 |
| GB | 783664 | | 9/1957 |
| GB | 851053 | | 10/1960 |
| GB | 1 010 649 | | 11/1965 |
| GB | 1012963 | | 12/1965 |
| GB | 1031040 | | 5/1966 |
| GB | 1055963 | | 1/1967 |
| GB | 1073605 | | 6/1967 |
| GB | 1075487 | | 7/1967 |
| GB | 1083847 | | 9/1967 |
| GB | 1085949 | | 10/1967 |
| GB | 1153981 | | 6/1969 |
| GB | 2313338 | | 11/1997 |
| JP | 2000-303347 | | 10/2000 |
| WO | 99/16608 | | 4/1999 |

* cited by examiner

APPARATUS AND METHOD FOR FLAME-PERFORATING FILMS

CROSS REFERENCE TO RELATED APPLICATION

This application is a divisional of U.S. application Ser. No. 11/343,766, filed Jan. 31, 2006 now U.S. Pat. No. 7,686,996, which is a divisional of U.S. application Ser. No. 10/267,538, filed Oct. 9, 2002, now U.S. Pat. No. 7,037,100, the disclosures of which are herein incorporated by reference.

BACKGROUND OF THE INVENTION

Various methods of making perforated polymer films are known. For example, U.S. Pat. No. 3,012,918 (Schaar), and British Patent Specification Nos. GB 851,053 and GB 854,473 all generally describe processes and apparatuses for improving the heat-sealability of polymeric films by passing the film over a cooled, hollow, rotating, metal cylinder or support roll with a desired perforation pattern while a jet of gas-heated air is directed onto the surface of the film so that specific areas of the film are melted, forming a pattern of perforations. The preferred linear speed of the film/web during the process is between 4-33 yards per minute. The apparatus in Schaar also includes a cooling jet of air directed at the cylinder surface, operating to maintain the surface temperature of the cylinder between 55 to 70° C.

U.S. Pat. No. 3,394,211 (MacDuff) discusses flame perforation of heat-shrinkable, biaxially oriented polypropylene films using a method and apparatus similar to U.S. Pat. No. 3,012,918 (Schaar) with the improvement of restraining the edges of the film by either adhesive or frictional engagement means, thus preventing transverse and/or longitudinal shrinkage during the perforation process. MacDuff also utilizes a heated air exhaust vent and a stream of cooling air to cool the surface of the support roll. The restraining system combined with the exhaust and cooling air system eliminate the need for a complex cooling system for the support roll/cylinder.

British Patent Specification No. GB 1,012,963 discloses a method and apparatus for flame perforating any suitable thermoplastic film capable of being softened and melted by heat. In GB 1,012,963 the tip of the flame just impinges on the outer surface of the plastic film as the film is slightly stretched and passes over a liquid coolant-chilled rotating cylinder, while the film is moving at a linear speed of approximately 10 yards per minute. The rotating cylinder has a pattern of indentations, which together with the flame promote the perforation of the film via the low heat conductivity of the air trapped behind the film in the indentations of the cylinder. The flame and burner in GB 1,012,963 are positioned at about mid-point of the segment of contact between the film with the cylinder surface.

British Patent Specification No. GB 1,083,847 teaches a method and apparatus for creating a net-like structure of polymer film by first forming protrusions in the film using heated pins on a nip roller, then biaxially stretching the film, flame perforating the protruding portions of the film as it passes over a chilled cylinder, using a process similar to GB 1,012,963 and finally biaxially stretching the film a second time.

Additionally, technical literature reports that flame treatment effectiveness increases as the flame-to-film distance decreases until the tip of the luminous cone of the flame reaches the poly(olefin) film surface, see for example *Flame Surface Modification of Polypropylene Film*, Strobel et. al., J. Adhesion Sci. Technology, Vol. 10, No. 6, page 529 (1996)

U.S. Pat. No. 5,891,967 (Strobel et. al.) discusses a flame-treating method of modifying a polymeric substrate, where the optimal distance of the flame to the film surface is generally less than 30 mm and can be as low as −2 mm, meaning approximately 2 mm of the tip of the luminous flame actually impinges the film surface. However, U.S. Pat. No. 5,891,967 also discloses that the distance is preferably between 0 mm and 10 mm and more preferably between 0 mm and 2 mm.

SUMMARY OF THE INVENTION

One aspect of the present invention provides an apparatus for flame-perforating film. The apparatus for flame-perforating film comprises: a frame; support surface attached to the frame, where the support surface includes a plurality of lowered portions; a burner attached to the frame opposite the support surface, where the burner supports a flame, and where the flame includes a flame tip opposite the burner; and a film contacting the support surface, where the flame of the burner is in contact with the film, where the burner is positioned such that the distance between an unimpinged flame tip of the flame and the burner is at least one-third greater than the distance between the film and the burner. In one preferred embodiment of the above apparatus, the apparatus further includes a backing roll attached to the frame, where the backing roll includes the support surface, and where the film is wrapped around at least a portion of the support surface of the backing roll. In one aspect of this embodiment, the apparatus further includes a nip roll attached to the frame adjacent the backing roll, where the film is between the nip roll and the backup roll. In another aspect of this embodiment, the apparatus further includes a temperature-controlled shield attached to the frame adjacent the backing roll, where the temperature-controlled shield is positioned between the burner and the nip roll. In yet another aspect of this embodiment, the nip roll includes an outer surface, and where the outer surface of the nip roll is temperature-controlled. In yet another aspect of this embodiment, the outer surface of the nip roll is heated greater than 165° F. (74° C.) for pre-heating the film prior to the burner. In another aspect of this embodiment, the outer surface of the nip roll is heated greater than or equal to 180° F. (82° C.) for pre-heating the film prior to the burner. In yet another aspect of this embodiment, the angle measured between the burner and the nip roll is less than 45°, where a vertex of the angle is positioned at the axis of the backing roll.

In another preferred embodiment of the above apparatus, the support surface moves relative to the burner. In another preferred embodiment of the above apparatus, the distance between the unimpinged flame tip of the flame and the burner is at least 2 millimeters greater than the distance between the film and the burner. In another preferred embodiment of the above apparatus, the apparatus further includes an air applicator attached to the frame adjacent the support surface for blowing air onto the support surface. In another preferred embodiment of the above apparatus, the apparatus further includes a liquid applicator attached to the frame for applying liquid onto the support surface. Another aspect of the present invention provides a flame-perforated film made by the apparatus above.

Another aspect of the present invention provides an alternative apparatus for flame-perforating film. The apparatus for flame-perforating film comprises: a frame; support surface attached to the frame, where the support surface includes a plurality of lowered portions; a burner attached to the frame opposite the support surface; and a preheat roll attached to the frame adjacent the support surface, where the preheat roll includes an outer surface, and where the outer surface of the preheat roll is heated for pre-heating the film prior to the burner. In one preferred embodiment of the above apparatus, the apparatus further includes a backing roll attached to the frame, where the backing roll includes the support surface, and where the preheat roll is a nip roll. In another aspect of this embodiment, the apparatus further includes a temperature-controlled shield attached to the frame adjacent the backing roll, where the temperature-controlled shield is positioned between the burner and the nip roll. In another aspect of this embodiment, the angle measured between the burner and the nip roll is less than 45°, where a vertex of the angle is positioned at the axis of the backing roll.

In one preferred embodiment of the above apparatus, the support surface moves relative to the burner. In another preferred embodiment of the above apparatus, the burner supports a flame, where the flame includes a flame tip opposite the burner, where the apparatus further includes a film contacting the support surface, where the flame of the burner is in contact with the film, where the burner is positioned such that the distance between an unimpinged flame tip of the flame and the burner is at least one-third greater than the distance between the film and the burner. In another aspect of this embodiment, the distance between the unimpinged flame tip of the flame and the burner is at least 2 millimeters greater than the distance between the film and the burner.

In yet another preferred embodiment of the above apparatus, the apparatus further includes an air nozzle assembly attached to the frame for blowing air onto the support surface. In yet another preferred embodiment of the above apparatus, the apparatus further includes a water nozzle assembly attached to the frame for applying water onto the support surface. In another preferred embodiment of the above apparatus, the outer surface of the preheat roll is heated greater than 165° F. (74° C.) for pre-heating the film prior to the burner. In another aspect of this embodiment, the outer surface of the preheat roll is heated greater than or equal to 180° F. (82° C.) for pre-heating the film prior to the burner. In another aspect of this embodiment, the support surface is cooled to a temperature lower than 120° F. (49° C.). Another aspect of the present invention provides a flame-perforated film made by the apparatus above.

Another aspect of the present invention provides an alternative apparatus for flame-perforating film. The apparatus for flame-perforating film comprises: a frame; support surface attached to the frame, where the support surface includes a plurality of lowered portions; a burner attached to the frame opposite the support surface; a film contacting the support surface; and a liquid applicator attached to the frame for applying liquid onto the support surface between the film and the support surface prior to contacting the film on the support surface. In one preferred embodiment of the above apparatus, the apparatus further includes a backing roll attached to the frame, where the backing roll includes the support surface. In one aspect of this embodiment, the apparatus further includes a nip roll attached to the frame adjacent the backing roll, where the film is between the nip roll and the backing roll. In another aspect of this embodiment, the apparatus further includes a temperature-controlled shield attached to the frame adjacent the backing roll, where the temperature-controlled shield is positioned between the burner and the nip roll. In yet another aspect of this embodiment, the angle measured between the burner and the nip roll is less than 45°, where a vertex of the angle is positioned at the axis of the backing roll. In another aspect of this embodiment, the nip roll includes an outer surface, and where the outer surface of the nip roll is heated for pre-heating the film prior to the burner. In another aspect of this embodiment, the outer surface of the nip roll is heated greater than 165° F. (74° C.) for pre-heating the film prior to the burner. In yet another aspect of this embodiment, the outer surface of the nip roll is heated greater than or equal to 180° F. (82° C.) for pre-heating the film prior to the burner.

In another embodiment of the above apparatus, the support surface moves relative to the burner. In yet another embodiment of the above apparatus, the burner supports a flame, where the flame includes a flame tip opposite the burner, where the apparatus further includes a film contacting the support surface, where the flame of the burner is in contact with the film, where the burner is positioned such that the distance between an unimpinged flame tip of the flame and the burner is at least one-third greater than the distance between the film and the burner. In one aspect of this embodiment, the distance between the unimpinged flame tip of the flame and the burner is at least 2 millimeters greater than the distance between the film and the burner. In another preferred embodiment of the above apparatus, the liquid applicator is a liquid nozzle assembly attached to the frame. Another aspect of the present invention provides a flame-perforated film made by the apparatus above.

Another aspect of the present invention provides a method of flame-perforating film. The method comprises the steps of: providing a film having a first side and a second side opposite the first side; contacting the second side of the film with a support surface having a plurality of lowered portions, where the support surface is cooled to a temperature lower than 120° F. (49° C.); contacting the first side of the film with a heated surface, where the heated surface is greater than 165° F. (74° C.); removing the heated surface from the first side of the film; and thereafter heating the first side of the film with a flame from a burner to perforate the film in the areas covering the plurality of lowered portions.

In one embodiment of the above method, contacting step includes contacting the first side of the film with a heated surface, where the heated surface is greater than or equal to 180° F. (82° C.). In another embodiment of the above method, the cooling step including cooling the support surface to a temperature lower than 105° F. (41° C.) to cool the second side of the film. Another aspect of the present invention provides a flame-perforated film made by the method above.

Another aspect of the present invention provides an alternative method of flame-perforating film. The method comprises the steps of: providing a support surface, where the support surface includes a plurality of lowered portions; providing a burner, where the burner supports a flame, and where the flame includes a flame tip opposite the burner; contacting a film against the support surface; positioning the burner such that the distance between an unimpinged flame tip of the flame and the burner is at least one-third greater than the distance between the film and the burner; and heating the film with the flame of the burner to perforate the film.

In one embodiment of the above method, the heating step includes perforating the film with a pattern corresponding to the plurality of lowered portions of the support surface. In another embodiment of the above method, the positioning step includes positioning the burner such that the distance between the unimpinged flame tip of the flame and the burner is at least 2 millimeters greater than the distance between the film and the burner. Another aspect of the present invention provides a flame-perforated film made by the method above.

Another aspect of the present invention provides another alternative method of flame-perforating film. The method comprises the steps of: providing backing roll having a support surface, where the support surface includes a plurality of lowered portions; providing a nip roll, where the nip roll includes an outer surface, and where the outer surface of the nip roll is heated; providing a burner, where the burner is positioned such that the angle measured between the burner and the nip roll is less than 45°, where a vertex of the angle is positioned at an axis of the backing roll; contacting a film against the support surface; pressing the film between the nip roll and the support surface of the backing roll to pre-heat the film; and thereafter perforating the film with a flame of the burner.

In one preferred embodiment of the above method, the method further includes the step of providing a temperature-controlled shield, where the temperature-controlled shield is positioned between the burner and the nip roll. Another aspect of the present invention provides a flame-perforated film made by the method above.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The present invention provides different embodiments of an apparatus for flame-perforating films and provides different embodiments of methods for flame-perforating films. Each embodiment of the apparatus contains different aspects of the apparatus that assist in flame-perforating films at high speeds, while maintaining acceptable film quality. Acceptable film quality includes fully and uniformly open, consistently formed perforations in films without wrinkles or other defects, such as tears, thermal damage, or forming partially formed perforations. These qualities in a perforated elastomeric or polymeric films are very important for particular end uses, such as providing an adhesive tape backing at a low cost with high tensile strength, excellent conformability, which has easy, straight, hand-tearability in both the longitudinal and transverse direction, without unwanted elongation of the tape while hand-tearing.

Figure 1:
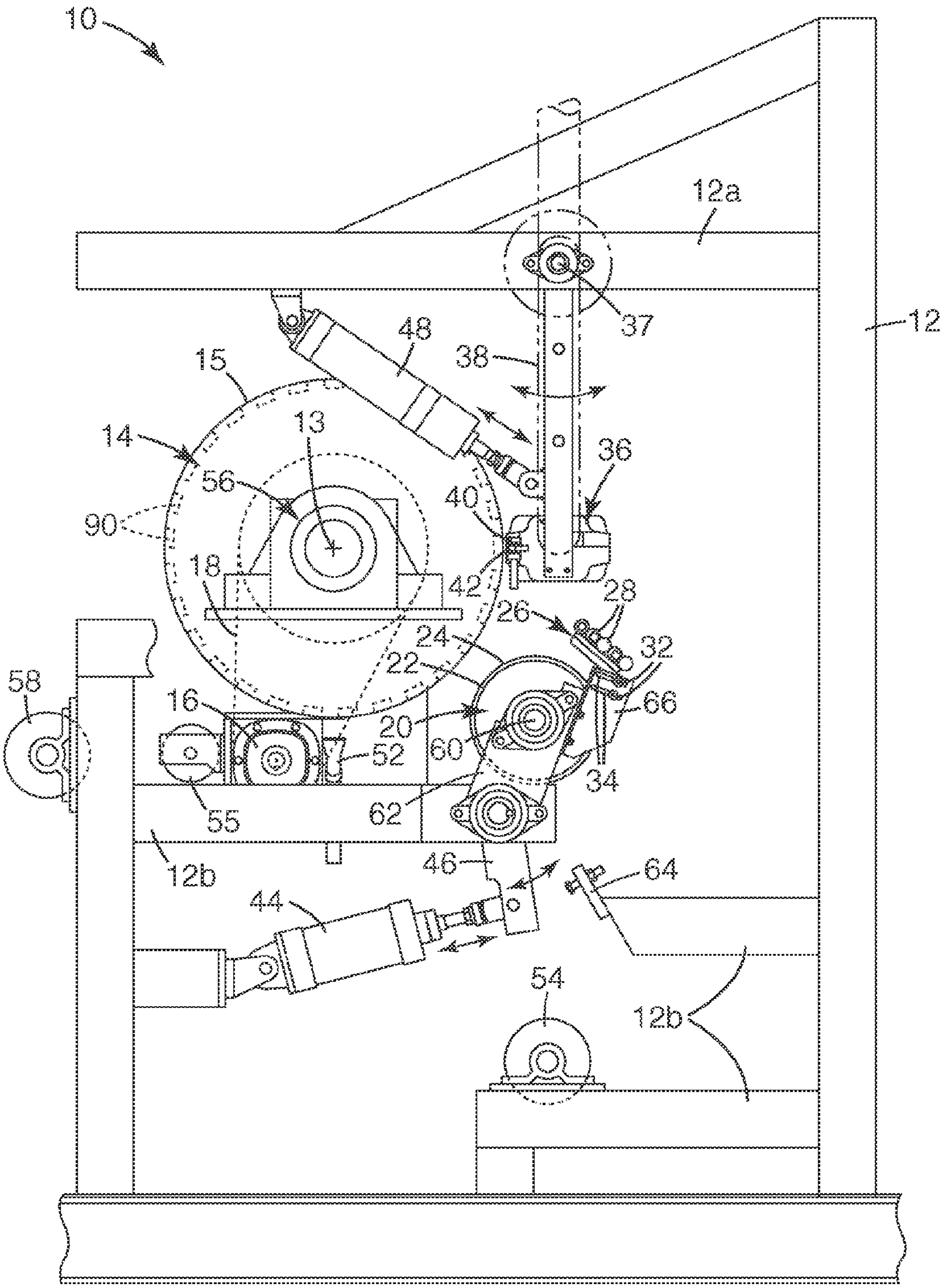
FIG. 1 is a side view of a flame-perforating apparatus of the present invention.
Figure 2:
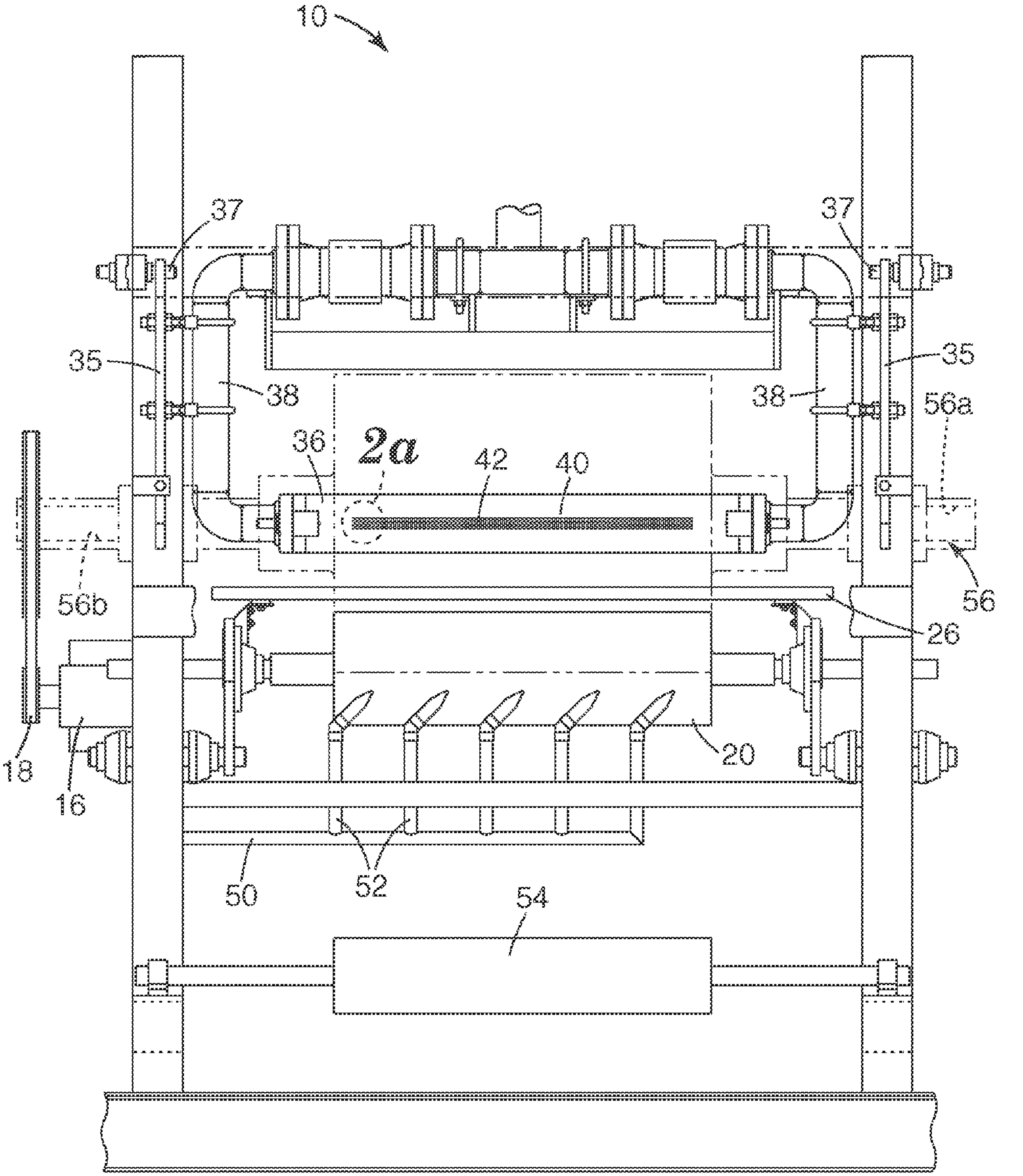
FIG. 2 is a front view of the apparatus of FIG. 1 with two of the idler rolls and motor removed for clarity, and the backing roll shown in phantom lines.

FIGS. 1 and 2 are illustrations of one preferred apparatus for making flame-perforated films of the present invention, which contains many different inventive aspects combined together. FIG. 1 illustrates a side view of the apparatus 10. FIG. 2 illustrates a front view of the apparatus with the backing roll 14 shown in phantom lines, and with the idler rollers 55, 58 and motor 16 removed, for clarity.

The apparatus 10 includes a frame 12. The frame 12 includes an upper portion 12*a* and a lower portion 12*b*. The apparatus 10 includes a backing roll 14 having an outer support surface 15. The support surface 15 preferably includes a pattern of lowered portions 90, shown in phantom lines. These lowered portions 90 and the portions of the support surface 15 between the lowered portions 90 collectively make up the support surface 15 of the backing roll 14. The lowered portions 90 form a pattern of indentions in the support surface 15. The lowered portions 90 may be a plurality of depressed or recessed portions or a plurality of indentations along the support surface 15. These lowered portions 90 are preferably etched into the support surface 15. Alternatively, the pattern of lowered portions 90 may be drilled, ablated, or engraved into the support surface 15. The lowered portions 90 preferably are in the shape of ovals, and preferably each have an approximate length of 70 mils (0.1778 cm) or less, an approximate width of 30 mils (0.0762 mm) or less, and an approximate depth of 8 mils (0.02032 cm) or more. One preferred example of a pattern of perforations is taught in PCT Publication, WO 02/11978, titled "Cloth-like Polymeric Films," (Jackson et al.), that published on Feb. 14, 2002, which is hereby incorporated by reference.

Preferably, the support surface 15 of the backing roll 14 is temperature-controlled, relative to the ambient temperature around the apparatus 10. The support surface 15 of the backing roll 14 may be temperature-controlled by any means known in the art. Preferably, the support surface 15 of the backing roll 14 is cooled by providing cooled water into the inlet portion 56*a* of hollow shaft 56, into the backing roll 14, and out of the outlet portion 56*b* of the hollow shaft 56. The backing roll 14 rotates about its axis 13. The apparatus 10 includes a motor 16 attached to the lower portion 12*b* of the frame. The motor drives a belt 18, which in turn rotates the shaft 56 attached to the backing roll 14, thus driving the backing roll 14 about its axis 13.

The apparatus 10 includes a burner 36 and its associated piping 38. The burner 36 and burner piping 38 are attached to the upper portion 12*a* of the frame 12 by burner supports 35. The burner supports 35 may pivot about pivot points 37 by actuator 48 to move the burner 36 relative to the support surface 15 of the backing roll 14. The supports 35 may be pivoted by the actuator 48 to position the burner 36 a desired distance either adjacent or away from the support surface 15 of backing roll 14, as explained in more detail with respect to FIGS. 4 and 5 below. The burner 36 includes a gas pipe 38 on each end for providing gas to the burner 36. The apparatus 10 may include an optional exhaust hood (not shown) mounted above the apparatus 10.

Figure 3:
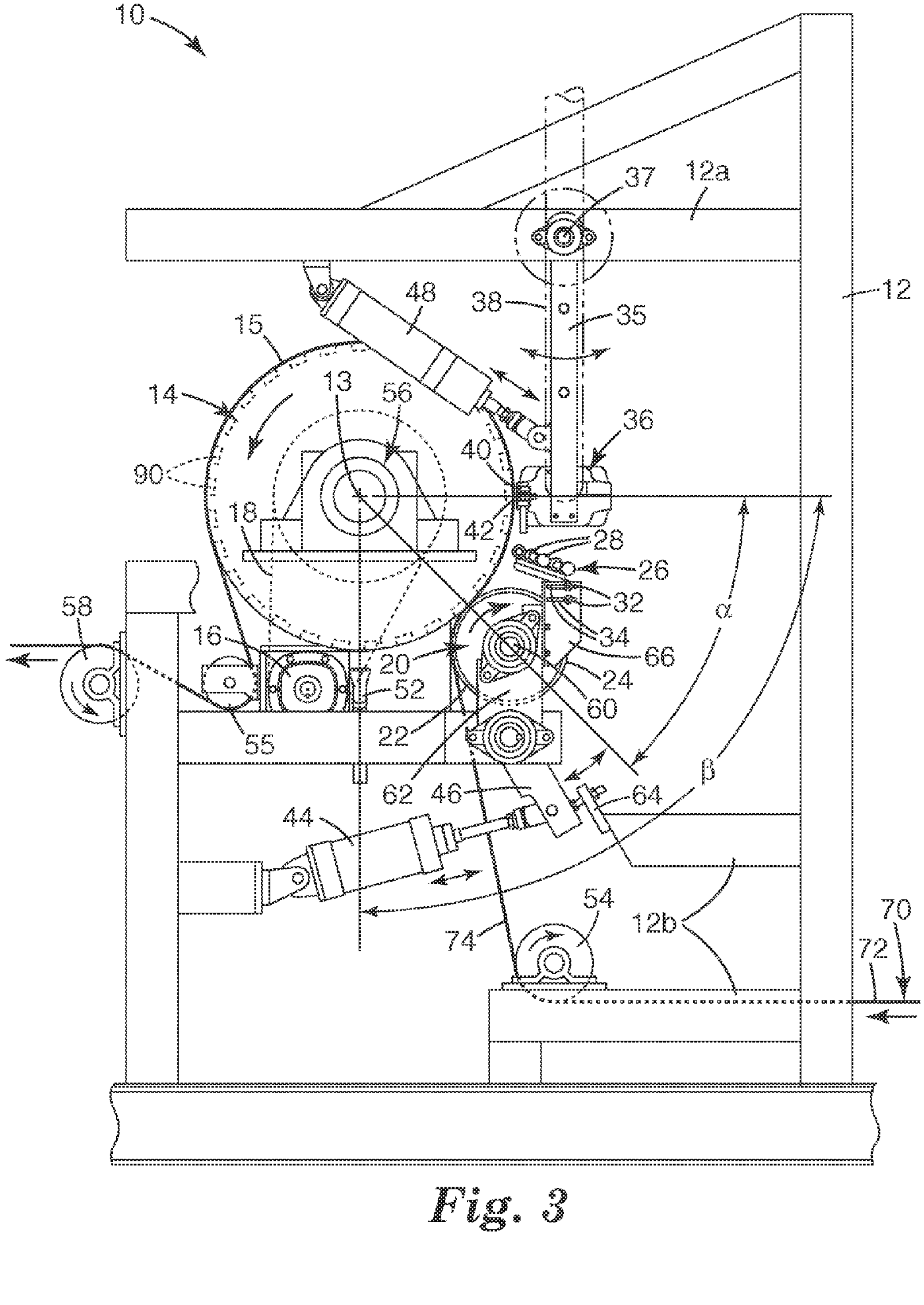
FIG. 3 is a side view of the apparatus of FIG. 1 including film moving along the film path within the apparatus.

In one embodiment of the present invention, the apparatus 10 includes a preheat roll 20 attached to the lower portion 12*b* of the frame 12. The preheat roll 20 includes an outer roll layer 22. The outer roll layer 22 includes an outer surface 24. Preferably, the outer roll layer is made of an elastomer, preferably a high-service-temperature elastomer. Preferably, the preheat roll 20 is a nip roll, which may be positioned against the backing roll 14 to nip the film between the nip roll 20 and backing roll 14. However, it is not necessary that the preheat roll 20 be a nip roll and instead, the preheat roll may be positioned away from the backing roll 14 so as to not contact the backing roll 14. The nip roll 20 freely rotates about its shaft 60 and is mounted to roll supports 62. Linkage 46 is attached to roll supports 62. The nip roll 20 may be positioned against the backing roll 14, using actuator 44. When the actuator 44 is extended (as shown in FIG. 3), the linkage 46 is rotated counterclockwise, and in turn, the roll supports 62 are rotated counterclockwise until the nip roll 20 contacts the backing roll 14. The actuator 44 may control the movement between the nip roll 20 and the backing roll 14, and thus may control the pressure between the nip roll 20 and backing roll 14. A stop 64 is attached to the lower frame 12*b* to inhibit the movement of the linkage 46 beyond the lower frame 12*b*, which help limit the pressure applied by the nip roll 20 against the backing roll 14.

In another embodiment of the present invention, the apparatus 10 includes a temperature-controlled shield 26 attached to the nip roll 20 by brackets 66 to form one assembly. Accordingly, when the actuator 44 rotates the nip roll 20, as explained above, the shield 26 moves with the nip roll. The shield 26 may be positioned relative to the nip roll 20 by bolts 32 and slots 34 attached to the brackets 66. The temperature-controlled shield 26 preferably includes a plurality of water-cooled pipes 28. However, other means of providing a temperature-controlled shield may be used, such as water-cooled plate, air-cooled plate, or other means in the art. Preferably, the temperature-controlled shield 26 is positioned between the burner 36 and the nip roll 20. In this position, the shield 26 protects the nip roll 20 from some of the heat generated from the burner 36, and thus, can be used to control the temperature of the outer surface 24 of the nip roll 20, which has the benefits of reducing wrinkles or other defects in the film at the flame-perforation step performed by the burner 36, while maintaining high film speeds.

In yet another embodiment of the present invention, the apparatus 10 includes an optional applicator 50 attached to the lower portion 12*b* of frame 12. The apparatus 10 includes a plurality of nozzles 52. In one embodiment, the applicator 50 is an air applicator for applying air onto the backing roll 14. In another embodiment, the applicator 50 is a liquid applicator for applying liquid onto the backing roll 14. Preferably, the liquid is water, however other liquids may be used instead. If the liquid is applied by the applicator 50, then preferably, air is also supplied to the individual nozzles to atomize the liquid prior to application on the backing roll. The manner in which the air or water may be applied to the backing roll 14 may be varied by one skilled in the art, depending on the pressure, rate or velocity of the air or water pumped through the nozzles 52. As explained below, without wishing to be bound by any theory, it is believed that if air or water is applied to the support surface 15 of the backing roll 14, prior to contacting the film to the support surface 15, then this application of air or water helps either remove some of the condensation built up on the support surface 15 or applies additional water to actively control the amount of water between the film and the support surface, and thereby helps in eliminating wrinkles or other defects formed in the film at the flame-perforation step conducted by the burner 36.

The apparatus 10 includes a first idle roller 54, a second idle roller 55, and a third idle roller 58 attached to the lower portion 12*b* of the frame 12. Each idle roller 54, 55, 58 includes their own shafts and the idle rollers may freely rotate about their shafts.

Figure 2A:
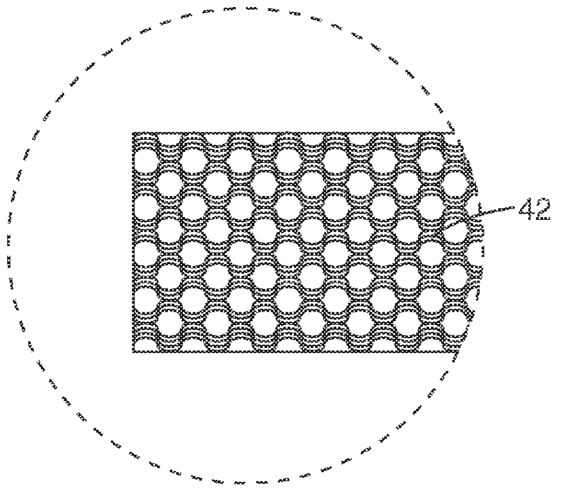
FIG. 2*a* is an enlarged view of the ribbons of the burner of the apparatus of FIG. 1.

FIG. 2*a* illustrates a blown-up view of the burner 36 useful with the apparatus 10 of FIG. 1. A variety of burners 36 are commercial available, for example, from Flynn Burner Corporation, New Rochelle, N.Y.; Aerogen Company, Ltd., Alton, United Kingdom, and Sherman Treaters Ltd., Thame, United Kingdom. One preferred burner is commercially available from Flynn Burner Corporation as Series 850, which has an eight-port, 32 inch actual length that was deckled to 27 inch in length, stainless steel, deckled ribbon mounted in a cast iron housing. A ribbon burner is most preferred for the flame perforation of polymer films, but other types of burners such as drilled-port or slot design burners may also be used. Preferably, the apparatus includes a mixer to combine the oxidizer and fuel before it feeds the flame used in the flame-perforating process of the invention.

FIG. 3 illustrates the path that the film travels through the apparatus 10 and one preferred method of flame-perforating films. The film 70 includes a first side 72 and a second side 74 opposite the first side 72. The film travels into apparatus 10 and around first idle roller 54. From there, the film is pulled by the motor-driven backing roll 14. In this position, the film is positioned between the nip roll 20 and the backing roll 14. In this step of the process, the second side 74 of the film 70 is cooled by the water-chilled backing roll 14 and the first side 72 of the film 70 is simultaneously heated by the outer surface 24 of the pre-heat or nip roll 20. This step of preheating the film 70 with the nip roll surface 22 of the nip roll 20 prior to flame-perforating the film with the burner 36 unexpectedly provided the benefits of reducing wrinkling or other defects in the film after the flame-perforation step was performed by the burner 36. These unexpected results are illustrated below in reference to Examples 13-27.

The temperature of the outer support surface 15 of the backing roll 14 may be controlled by the temperature of the water flowing through the backing roll 14 through shaft 56. The temperature of the outer support surface 15 may vary depending on its proximity to the burner 36, which generates a large amount of heat from its flames. In addition, the temperature of the support surface 15 will depend on the material of the support surface 15.

The temperature of the outer surface 24 of the outer layer 22 of the nip roll 20 is controlled by a number of factors. First, the temperature of the flames of the burner affects the outer surface 24 of the nip roll 20. Second, the distance between the burner 36 and the nip roll 20 affects the temperature of the outer surface 24. For example, positioning the nip roll 20 closer to the burner 36 will increase the temperature of the outer surface 24 of the nip roll 20. Conversely, positioning the nip roll farther away from the burner 36 will decrease the temperature of the outer surface 24 of the nip roll 20. The distance between the axis of nip roll 20 and the center of the burner face 40 of the burner 36, using the axis 13 of the backing roll 14 as the vertex of the angle, is represented by angle $\alpha$. Angle $\alpha$ represents the portion of the circumference of the backing roll or the portion of the arc of the backing roll between the nip roll 20 and the burner 36. It is preferred to make angle $\alpha$ as small as possible, without subjecting the nip roll to such heat from the burner that the material on the outer surface of the nip roll starts to degrade. For example, angle $\alpha$ is preferably less than or equal to 45°. Third, the temperature of the outer surface 24 of the nip roll 20 may also be controlled by adjusting the location of the temperature-controlled shield 26 between the nip roll 20 and the burner 36, using bolts 32 and slots 34 of the brackets 66. Fourth, the nip roll 20 may have cooled water flowing through the nip roll, similar to the backing roll 14 described above. In this embodiment, the temperature of water flowing through the nip roll may affect the surface temperature of the outer surface 24 of the nip roll 20. Fifth, the surface temperature of the support surface 15 of the backing roll 14 may affect the surface temperature of the outer surface 24 of the nip roll 20. Lastly, the temperature of the outer surface 24 of the nip roll 20 may also by impacted by the ambient temperature of the air surrounding the nip roll 20.

Preferred temperatures of the support surface 15 of backing roll 14 are in the range of 45° F. to 130° F., and more preferably are in the range of 50° F. to 105° F. Preferred temperatures of the nip roll surface 24 of nip roll 20 are in the range of 165° F. to 400° F., and more preferably are in the range of 180° F. to 250° F. However, the nip roll surface 24 should not rise above the temperature at which the nip roll surface material may start to melt or degrade. Although the preferred temperatures of the support surface 15 of the backing roll 14 and the preferred temperatures of the nip roll surface 24 of the nip roll 20 are listed above, one skilled in the art, based on the benefits of the teaching of this application, could select preferred temperatures of the support surface 15 and nip roll surface 24 depending on the film material and the rotational speed of the backing roll 14 to flame-perforate film with reduced numbers of wrinkles or defects.

Returning to the process step, at this location between the preheat roll 20 and backing roll 14, the preheat roll preheats the first side 72 of the film 70 prior to contacting the film with the flame of the burner. Unexpectedly, the temperature of the preheat roll is critical in helping to eliminate wrinkles or other defects in the film at the flame-perforation step, as illustrated Examples 13-27 below.

Figure 5:
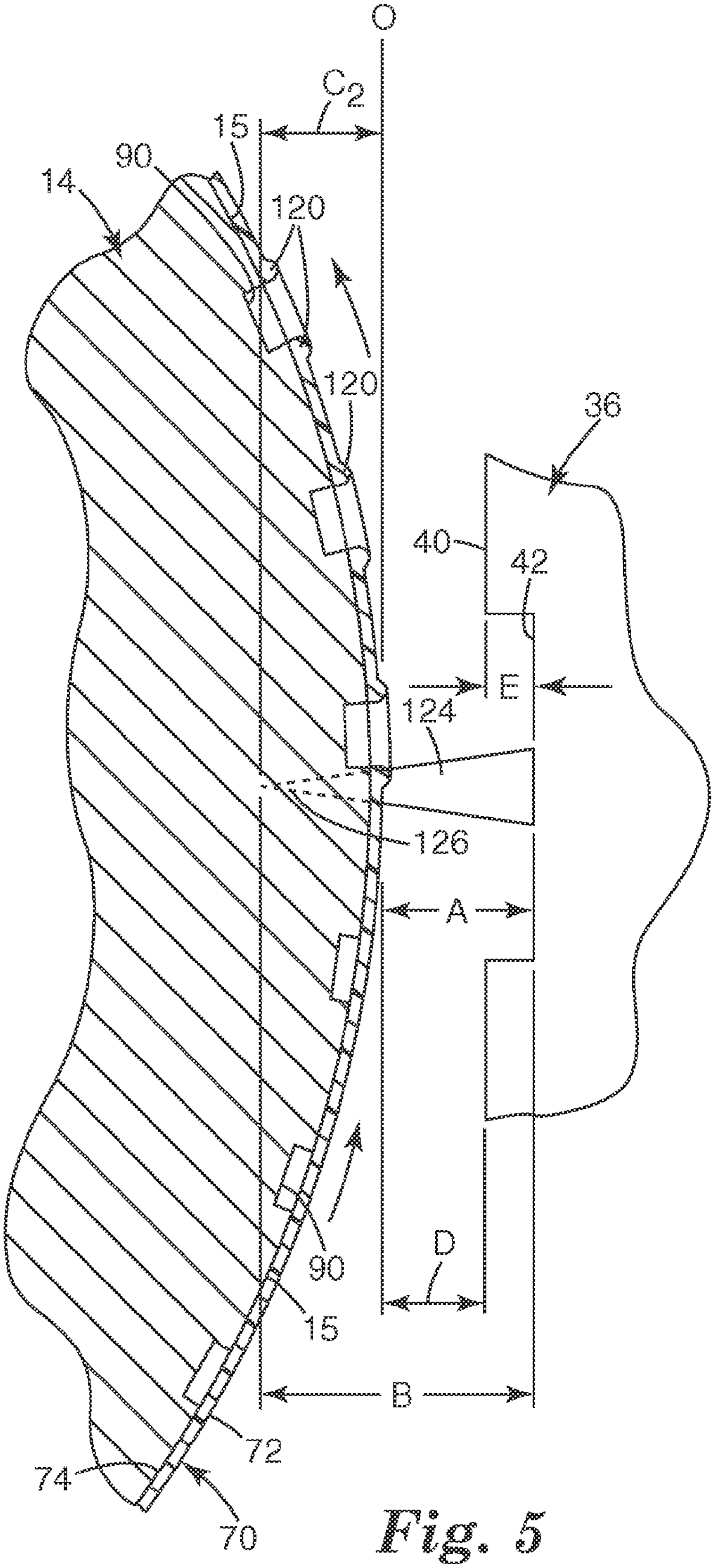
FIG. 5 is a view like FIG. 4 with the flame of the burner impinging the film.

In the next step of the process, the backing roll 14 continues to rotate moving the film 70 between the burner 36 and the backing roll 14. This particular step is also illustrated in FIG. 5, as well as FIG. 3. When the film comes in contact with the flames of the burner 36, the portions of the film that are directly supported by the chilled metal support surface are not perforated because the heat of the flame passes through the film material and is immediately conducted away from the film by the cold metal of the backing roll 14, due to the excellent heat conductivity of the metal. However, a pocket of air is trapped behind those portions of the film material that are covering the etched indentations or lowered portions 90 of the chilled support material. The heat conductivity of the air trapped in the indentation is much less than that of the surrounding metal and consequently the heat is not conducted away from the film. The portions of film that lie over the indentations then melt and are perforated. As a result, the perforations formed in the film 70 correlate generally to the shape of the lowered portions 90. At about the same time that film material is melted in the areas of the lowered portions 90, a raised ridge or edge 120 is formed around each perforation, which consists of the film material from the interior of the perforation that has contracted upon heating.

After the burner 36 has flame-perforated the film, the backing roll 14 continues to rotate, until the film 70 is eventually pulled away from the support surface 15 of the backing roll 14 by the idler roller 55. From there, the flame-perforated film 70 is pulled around idler roll 58 by another driven roller (not shown). The flame-perforated film may be produced by the apparatus 10 in long, wide webs that can be wound up as rolls for convenient storage and shipment. Alternatively, the film 70 may be combined with a layer of pressure-sensitive adhesive or other films to provide tape, as discussed in reference to FIG. 7.

As mentioned above, the apparatus 10 may include the optional applicator 50 for either applying air or water to the support surface 15 of the backing roll 14, prior to the film 70 contacting the support surface between the backing roll 14 and the nip roll 20. Without wishing to be bound by any theory, it is believed that controlling the amount of water between the film 70 and the support surface 15 helps reduce the amount of wrinkles or other defects in the flame-perforated film. There are two ways in which to control the amount of water between the film 70 and the support surface 15. First, if the applicator 50 blows air onto the support surface, then this action helps reduce the amount of water build up between the film 70 and support surface 15. The water build up is a result of the condensation that is formed on the backing roll surface when the water-cooled support surface 15 is in contact with the surrounding environment. Second, the applicator 50 may apply water or some other liquid to the support surface 15 to increase the amount of liquid between the film 70 and the support surface. Either way, it is believed that some amount of liquid between the film 70 and the support surface 15 may help increase the traction between the film 70 and the support surface 15, which in turn helps reduce the amount of wrinkles or other defects in the flame-perforated film. The position of the nozzles 52 of the applicator 50 relative to the centerline of the burner 36 is represented by angle β, where the vertex of the angle is at the axis of the backing roll 14. Preferably, the applicator 50 is at an angle β greater than angle α, so that the air or water is applied to the backing roll 14 prior to the nip roll 20. Table 2 in the Examples below shows that maintaining some level of water in between the backing roll and the film improved the overall quality of the perforated film. However, it was also observed that poor perforation quality would also result with an excess of water applied to the indentation pattern of the backing roll because water that is either partially or completely filling the indentations provides such good heat conductivity that the BOPP film over the indentations is not exposed to sufficient heat to form perforations in the film.

Figure 4:
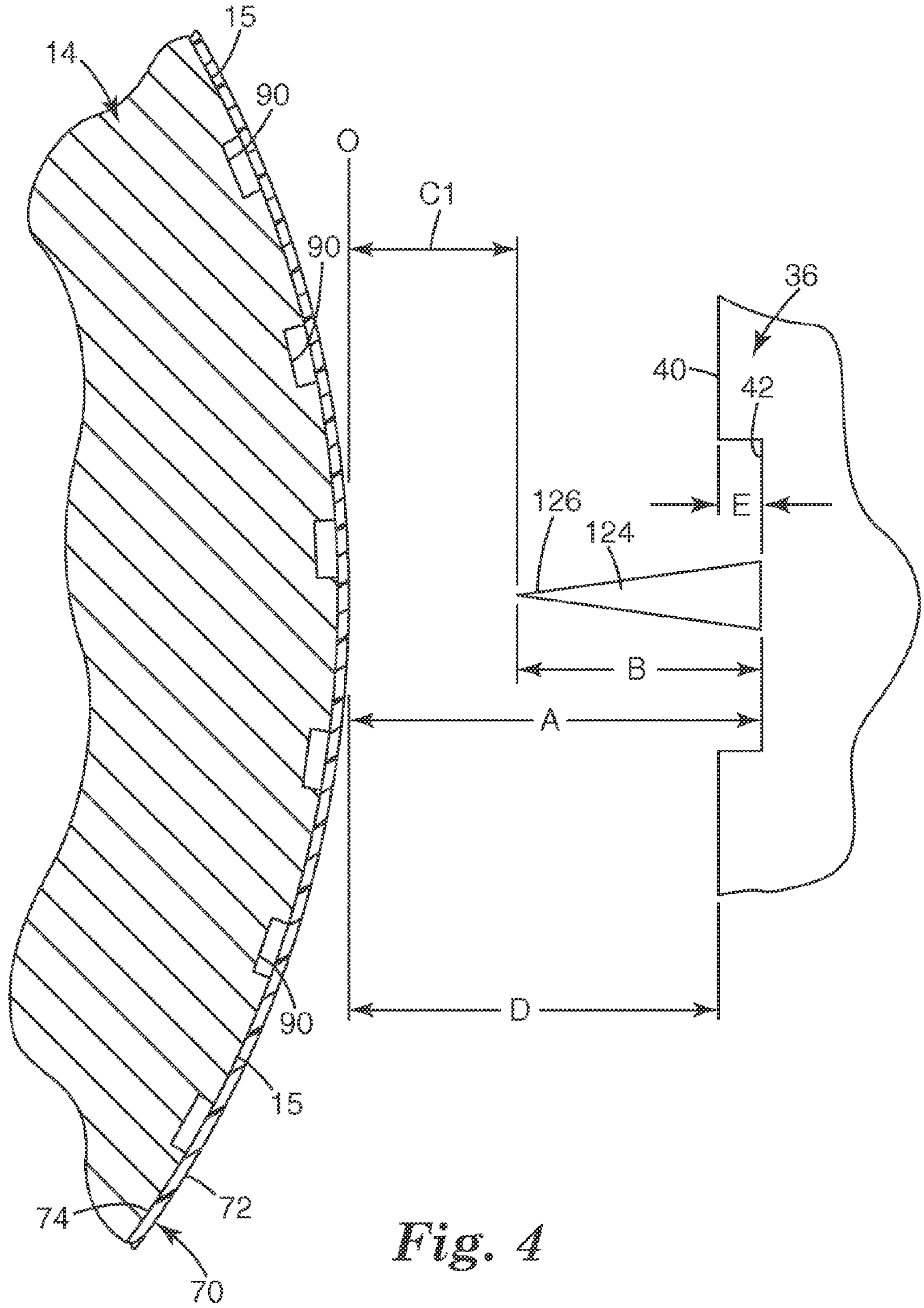
FIG. 4 is an enlarged cross-sectional view of portions of the burner, film, and backing roll with a flame of the burner positioned away from the film, such that the flame is an unimpinged flame.

FIGS. 4 and 5 schematically illustrate yet another embodiment of the apparatus of the present invention. FIGS. 4 and 5 illustrate the criticality of the placement of the flame 124 relative to the support surface 15 of the backing roll 14 during the flame-perforation step. In FIG. 4, the burner 36 is at some distance relative to the backing roll 14, and in FIG. 5, the burner 36 is positioned closer to the backing roll 14 relative to FIG. 4. The relative distance between the burner 36 and backing roll 14 may be adjusted by the burner supports 35 and the actuator 48, as explained above in reference to FIG. 1.

There are several distances represented by reference letters in FIGS. 4 and 5. Origin "O" is measured at a tangent line relative to the first side 72 of the film wrapped around the backing roll 14. Distance "A" represents the distance between the ribbons 42 of the burner 40 and the first side 72 of the film 70. Distance "B" represents the length of the flame, as measured from the ribbons 42 of the burner 36, where the flame originates, to the tip 126 of the flame. The flame is a luminous cone supported by the burner, which can be measured from origin to tip with means known in the art. Actually, the ribbon burner 36 has a plurality of flames and preferably, all tips are at the same position relative to the burner housing, preferably uniform in length. However, the flame tips could vary, for example, depending on non-uniform ribbon configurations or non-uniform gas flow into the ribbons. For illustration purposes, the plurality of flames is represented by the one flame 124. Distance "D" represents the distance between the face 40 of the burner 36 and the first side 72 of the film 70. Distance "E" represents the distance between the ribbons 42 of the burner 36 and the face 40 of the burner 36.

In FIG. 4, distance "C1" represents the relative distance between distance A and distance B, if they were subtracted A-B. This distance C1 will be a positive distance because the flame 124 is positioned away from the backing roll 14 and thus, does not impinge the film 70 on the backing roll 14, and is defined as an "unimpinged flame." In this position, the flame may be easily measured in free space by one skilled in the art, and is an uninterrupted flame. In contrast, FIG. 5 illustrates the burner positioned much closer to the film 70 on the backing roll 14, such that the tip 126 of the flame 124 actually impinges the film 70 on the support surface 15 of the backing roll 14. In this position, "C2" represents distance A subtracted from distance B, and will necessarily be a negative number. Preferably, distance A subtracted from distance B is greater than a negative 2 mm. Unexpectedly, it was found that perforated films could be produced at higher speeds with a C2 distance of large negative numbers, while still maintaining film quality. This was unexpected in light of the prior art, which teaches that optimal flame conditions are achieved with a positive or zero C1 distance. These unexpected result are illustrated by Examples 1-9 below.

Preferably, the film 70 a polymeric substrate. The polymeric substrate may be of any shape that permits perforation by flame and include, for example, films, sheets, porous materials and foams. Such polymeric substrates include, for example, polyolefins, such as polyethylene, polypropylene, polybutylene, polymethylpentene; mixtures of polyolefin polymers and copolymers of olefins; polyolefin copolymers containing olefin segments such as poly(ethylene vinylacetate), poly(ethylene methacrylate) and poly(ethylene acrylic acid); polyesters, such as poly(ethylene terephthalate), poly (butylene phthalate) and poly(ethylene naphthalate); polystyrenes; vinylics such as poly(vinyl chloride), poly(vinylidene dichloride), poly(vinyl alcohol) and poly(vinyl butyral); ether oxide polymers such as poly(ethylene oxide) and poly(methylene oxide); ketone polymers such as polyetheretherketone; polyimides; mixtures thereof, or copolymers thereof. Preferably, the film is made of oriented polymers and more preferably, the film is made of biaxially oriented polymers. Biaxially oriented polypropylene (BOPP) is commercially available from several suppliers including: ExxonMobil Chemical Company of Houston, Tex.; Continental Polymers of Swindon, UK; Kaisers International Corporation of Taipei City, Taiwan and PT Indopoly Swakarsa Industry (ISI) of Jakarta, Indonesia. Other examples of suitable film material are taught in PCT Publication, WO 02/11978, titled "Cloth-like Polymeric Films," (Jackson et al.), that published on Feb. 14, 2002, which is hereby incorporated by reference.

Figure 6:
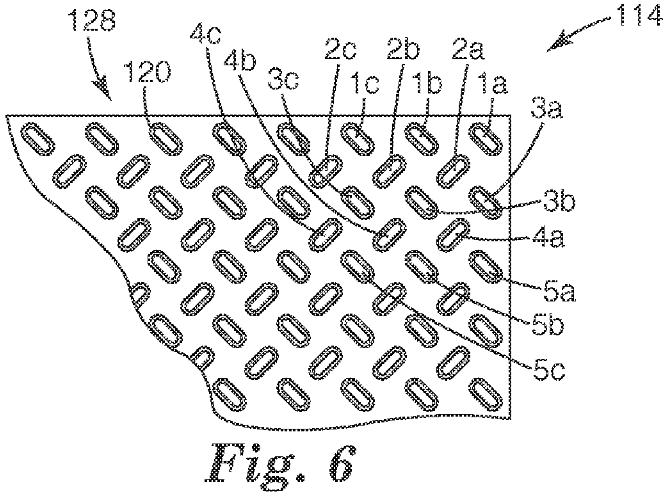
FIG. 6 is a top plan view of a pattern of perforations in film, after the film has been perforated with the flame-perforating apparatus of FIG. 1.

FIG. 6 illustrates a top view of a pattern of perforations in film after it has been perforated with the flame-perforating apparatus of FIG. 1. The perforations are typically elongate ovals, rectangles, or other non-circular or circular shapes arranged in a fashion such that the major axis of each perforation intersects adjacent perforations or passes near adjacent perforations. This perforated polymeric film 114 can be joined to one or more additional layers or films, such as a top layer to provide durability or impermeability, or a bottom layer to provide adhesiveness.

The perforation pattern formed in polymeric film 114 has a strong influence on the tear and tensile properties of the perforated films and tape backings of the invention. In FIG. 6, a portion of an enlarged layout of a typical perforation pattern 128 is shown, with the machine direction oriented up and down, and the transverse direction oriented left to right. Depicted perforation pattern 128 comprises a series of rows of perforations, identified as a first row having perforations 1*a*, 1*b*, and 1*c*; a second row having perforations 2*a*, 2*b*, and 2*c*; a third row having perforations 3*a*, 3*b*, and 3*c*; a fourth row having perforations 4*a*, 4*b*, and 4*c*; and a fifth row having perorations 5*a*, 5*b*, and 5*c*. The perforation pattern 128 includes other rows of perforations, similar to the first row through the fifth row. Each perforation includes a raised ridge or edge 120. In specific implementations, this raised ridge 120 has been observed to provide enhanced tear properties of the perforated film 114. The raised ridge 120 can also impart slight textures that cause the film 114 to more closely resemble a cloth-like material. Typically the perforations form a pattern extending along most or all of the surface of a film, and thus the pattern shown in FIG. 6 is just a portion of one such pattern.

As explained above in reference to FIG. 5, the perforation pattern 128 formed in film 114 correlates generally to the pattern of lowered portions 90 formed into the support surface 15 of backing roll 14. The film shown in FIG. 6 includes numerous perforations, each of which are generally oval-shaped, preferably includes a length of approximately three-times greater than the width. However, one skilled in the art could select any pattern of lowered portions 90 in support surface 15 of the backing roll 14 to create alternative perforation patterns or sizes.

The films described herein are suited for many adhesive tape backing applications. The presence of a top film over the perforation pattern can provide an appearance similar to a poly-coated cloth-based tape backing in certain embodiments. This appearance, combined with the tensile and tear properties, makes the film useful as a backing for duct tape, gaffer's tape, or the like. Particularly for duct tape, incorporation of known appropriate pigments for a silver-gray coloration into the top film contributes to a familiar appearance, which is desired in the marketplace. Because the backing is conformable, it is also useful as a masking tape backing.

Figure 7:
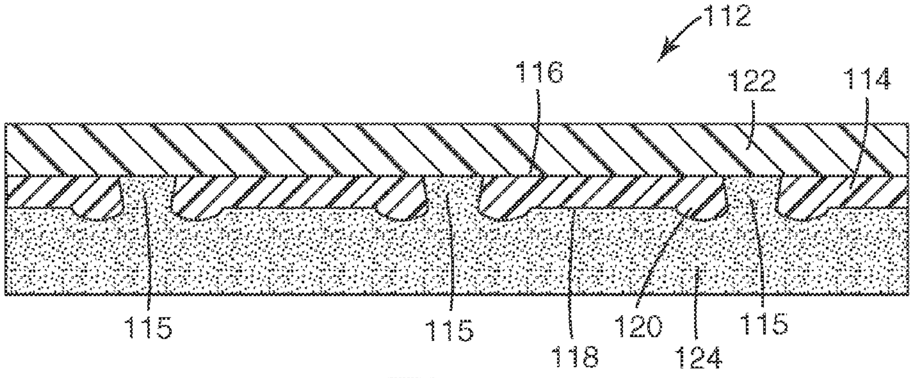
FIG. 7 is a cross-sectional view of a tape including the film of FIG. 6.

FIG. 7 illustrates a cross-sectional view of one embodiment of a tape 112 including the film of FIG. 6 as a tape backing Tape 112 contains a perforated film 114 having first major surface 116 and second major surface 118. Perforated film 114 contains perforations 115 extending through its thickness. In the embodiment illustrated, the edges of each perforation 115 along second major surface 118 include raised portions 120. Perforated film 114 is typically an oriented film, more preferably a biaxially oriented film.

Polymeric tape 112 further includes a top film 122 and a bottom layer 124. In the embodiment illustrated, top film 122 provides durability to the polymeric tape 112, and can further increase the strength and impart fluid impermeability to tape 112. Bottom layer 124 is, for example, an adhesive composition. Additional or alternative layers can be used to create tape 112. The arrangement of the layers can also be changed. Thus, for example, the adhesive can be applied directly to the top film 122 rather than to the perforated layer.

The operation of the present invention will be further described with regard to the following detailed examples. These examples are offered to further illustrate the various specific and preferred embodiments and techniques. It should be understood, however, that many variations and modifications may be made while remaining within the scope of the present invention.

The custom-designed flame perforation system described above was used to generate examples 1-9, perforated films of biaxially oriented polypropylene (BOPP). The operating conditions were as follows. Dust-filtered, 25° C. compressed air was premixed with a natural gas fuel (having a specific gravity of 0.577, a stoichiometric ratio of dry air:natural gas of 9.6:1, and a heat content of 37.7 kJ/L) in a venturi mixer, available from Flynn Burner Corporation, of New Rochelle, N.Y., to form a combustible mixture. The flows of the air and natural gas were measured with mass flow meters available from Flow Technology Inc. of Phoenix, Ariz. The flow rates of natural gas and air were controlled with control valves available from Foxboro-Eckardt. All flows were adjusted to result in a flame equivalence ratio of 0.96 (air:fuel ratio of 10:1) and a normalized flame power of 12,000 Btu/hr-in. (1385 W/cm$^2$). The combustible mixture passed through a 3 meter long pipe to a ribbon burner, which consisted of a 33 cm×1 cm, 6-port corrugated stainless steel ribbon mounted in a cast-iron housing, supplied by Flynn Burner Corporation, New Rochelle, N.Y.

The burner was mounted adjacent a 35.5 cm diameter, 46 cm face-width, steel, spirally-wound, double-shelled, chilled backing roll, available from F.R. Gross Company, Inc., Stow Ohio. The temperature of the backing roll was controlled by a 240 l/min recirculating flow of water at a temperature of 70° F. (21° C.). The steel backing roll core was plated with 0.5 mm of copper of a 220 Vickers hardness, then engraved by Custom Etch Rolls Inc. of New Castle, Pa., with a perforation pattern shown in FIG. 6. Filtered, compressed air at a pressure of 10 psi (69 kPa/m$^2$) was blown onto the chilled backing roll to controllably reduce the amount of water condensation accumulating on the patterned portion of the backing roll.

An electric spark ignited the combustible mixture. Stable conical flames were formed with tips approximately 14 mm from the face of the burner housing, representing the D distance. The E distance was equal to 3 mm. A thermally extruded, biaxially oriented polypropylene (BOPP) homopolymer film, which was 1.2 mil (0.03 mm) thick and 30 cm wide, was guided by idler rolls to wrap around the chilled backing roll and processed through the system at an adjustable speed. The upstream tension of the film web was maintained at approximately 0.83 N/cm and the downstream tension was approximately 0.1 N/cm.

To insure intimate contact between the BOPP film and the chilled backing roll, a 10 cm diameter, 40 cm face-width, inbound nip roll, available from American Roller Company, Kansasville, Wis., covered with 6 mm of VN 110 (80 Shore A durometer) VITON fluoroelastomer, was located at an adjustable position of approximately 45 degrees relative to the burner, on the inbound side of the chilled backing roll. Positioned between the nip roll and the burner a water-cooled shield, which was maintained at a temperature of 50° F. (10° C.) with recirculating water. The nip roll-to-backing roll contact pressure was maintained at approximately 50 N/lineal cm.

Table 1 shows the results of an experiment where the distance between the surface of the burner ribbons and the chilled backing roll was adjusted to evaluate the effect of flame-to-film separation distance on perforation quality. The maximum film speed that continued to provide 100% open perforations across the entire width of the film was determined. The unimpinged flame length, represented as distance "B" in FIG. 4, was 17 mm. It should also be noted that as the burner-to-film separation distance, designated as distance "A" in FIGS. 4 and 5, was decreased, eventually the flame became unstable and typically extinguished at the burner-to-film separation distance of 6 mm. The flame-to-film distance is represented as distance "$C_1$" in FIG. 4 and distance "$C_2$" in FIG. 5. Once the burner is set at the appropriate distance from the film supported on the backing roll, the percentage of total flame that is impinged or interrupted is calculated as "$C_2$" divided by the total flame length (17 mm).

TABLE 1

| Example | Burner-to-Film Separation (mm) Distance "A" | Flame-to-Film Separation (mm) Distance "$C_1$" or "$C_2$" | Percent (%) of Flame Impinged | Maximum Perforation Speed (m/min) | Overall Quality* of Perforation and Film (1-5) |
|---|---|---|---|---|---|
| 1 | 8 | $C_2 = -9$ | 53% | 77 | 2 |
| 2 | 10 | $C_2 = -7$ | 41% | 73 | 2 |
| 3 | 12 | $C_2 = -5$ | 29% | 69 | 1 |
| 4 | 13 | $C_2 = -4$ | 24% | 69 | 1 |
| 5 | 15 | $C_2 = -2$ | 12% | 63 | 1 |
| 6 | 17 | $C_1 = 0$ | Unimpinged | 60 | 1 |
| 7 | 18 | $C_1 = 1$ | Unimpinged | 58 | 1 |
| 8 | 20 | $C_1 = 3$ | Unimpinged | 53 | 1 |
| 9 | 23 | $C_1 = 6$ | Unimpinged | 48 | 1 |

*Quality Range: 1 = excellent quality with no visible defects, 2 = minimal defects, 3 = plainly visible defects, marginally acceptable, 4 = unacceptable amount of defects, 5 = gross defects inhibiting processing.

As shown in Table 1, increased film perforation speeds can be achieved, while maintaining acceptable quality, when the flame-to-film separation distance, "$C_2$", is less than −4 mm.

Examples 10-12 were flame perforated as in Examples 1-9 with the following exceptions: flame power is 15,000 Btu/hr-in. (1600 W/cm$^2$); the burner housing-to-backing roll distance, also known as burner-to-film distance, designated as distance "D" in FIG. 5, was set to 7 mm; and additional modifications as specified in Table 2. A custom-built air impingement system utilizing 3 air nozzles was installed to blow compressed air onto the chilled backing roll at a pressure of 10 PSI (69 kPa/m$^2$). Additionally, for Example 12a water-application system including 2 nozzles, model number 1/8 VAU-SS+SUV67A-SS H56430-1, available from Spraying System Company of Wheaton, Ill., was used to atomize and then apply a thin layer of water to the backing roll at a rate of approximately 32 mL/min. Both the air nozzles and the water-application system were located approximately 45 degrees prior to the nip roll, relative to the axis of the backing roll.

TABLE 2

| System Variable | Example 10 | Example 11 | Example 12 |
|---|---|---|---|
| Film Speed (m/min) | 60 | 60 | 92 |
| Roll Cooling Water Temperature | 90° F. (32° C.) | 50° F. (10° C.) | 105° F. (41° C.) |
| Air Nozzles | Off | On @ 10 psi (69 kPa/m$^2$) | Off |
| Water on Backing Roll | No | Yes (Condensation) | Yes (Applied Water) |
| Results: Overall Quality* | 4 | 1 | 1 |

*Quality Range: 1 = excellent quality - with no visible defects, 2 = minimal defects, 3 = plainly visible defects, marginally acceptable, 4 = unacceptable amount of defects, 5 = gross defects inhibiting processing.

Table 2 shows that maintaining some level of water in between the backing roll and the BOPP film improved the overall quality of the perforated film. However, it was observed that poor perforation quality would also result with an excess of water applied to the indentation pattern of the backing roll because water that is either partially or completely filling the indentations provides such good heat conductivity that the BOPP film over the indentations is not exposed to sufficient heat to form perforations in the film.

Examples 13-27 were flame perforated as in Examples 10-12 with the following exceptions. The same perforation pattern as used in examples 1-12 was employed on a larger chilled backing roll with a 61 cm diameter and a 76 cm face width. The perforation pattern itself was 63.5 cm in width across the backing roll and the backing roll was polished to a mirror finish, with an approximate Ra roughness value of less than 8 micrometers. A 76 cm wide, 23 cm outer diameter, water-cooled nip roll, of the same construction and from the same supplier as described in Examples 1-9, was employed to insure intimate contact between the BOPP film and the chilled backing roll. A 66 cm wide BOPP film was feed through the system to be perforated. The temperature of the backing roll was controlled by recirculating flow of water of 700 l/min at a temperature of 50° F. (10° C.). The upstream tension and downstream tension were approximately 0.8 N/cm. The film speed was 92 m/min. The water-cooled shield was maintained at approximately 80° F. (27° C.). A custom-built air impingement system utilizing 5 air nozzles was installed to blow compressed air onto the chilled backing roll at a flow rate of approximately 500 l/min. The burner employed was a 68 cm×1 cm, 8-port ribbon burner, available from Flynn Burner Corporation, New Rochelle, N.Y.

Experiments were conducted which varied the shield gap and the burner position, while monitoring the nip roll surface temperature. The shield gap was defined as the distance between the water-cooled shield and the backing roll. The burner position, which is designated as angle α in FIG. 5, described above. Nip roll surface temperature, which was indirectly controlled by the burner position and the shield gap, was measured to approximately ±10° F. (±6° C.) with a 3M model number IR-750EXB infrared pyrometer, supplied by 3M Company of St. Paul, Minn.

TABLE 3

| Example | Burner Position relative to nip roll (angle α) | Shield gap cm | Nip Roll Surface Temp. ° F. | Nip Roll Surface Temp. ° C. | Wrinkle Defects |
|---|---|---|---|---|---|
| 13 | 45° | 0.16 | 70-75 | 21-24 | Yes |
| 14 | 45° | 0.32 | 85-95 | 29-35 | Yes |
| 15 | 45° | 0.16 | 118 | 48 | Yes |
| 16 | 60° | 0.64 | 125 | 52 | Yes |
| 17 | 60° | 0.64 | 140 | 60 | Yes |
| 18 | 45° | 0.32 | 143 | 62 | Yes |
| 20 | 45° | 0.48 | 140-160 | 60-71 | Yes |
| 19 | 45° | 0.16 | 165 | 74 | Yes |
| 21 | 45° | 0.64 | 180 | 82 | No |
| 22 | 45° | 0.48 | 188 | 87 | No |
| 23 | 45° | >0.64* | 215-225 | 102-107 | No |
| 24 | 45° | 0.64 | 230-250 | 110-121 | No |
| 25 | 45° | 0.64 | 235-240 | 113-116 | No |
| 26 | 45° | 0.79 | 245-260 | 118-127 | No |
| 27 | 45° | 1.91 | 320-360 | 160-182 | No |

*Loose gap

The results in Table 3 indicate that wrinkle defects are reduced when the nip roll surface temperature is maintained above a temperature of at least about 165° F. (76° C.), more preferably above a temperature of about 180° F. (82° C.).

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An apparatus for flame-perforating film, comprising:

a frame;

a backing roll attached to the frame wherein the backing roll includes a support surface with a plurality of lowered portions;

a nip roll attached to the frame adjacent the backing roll a burner attached to the frame opposite the support surface, wherein the burner supports a flame, and wherein the flame includes a flame tip opposite the burner; and a film contacting and wrapped around at least a portion of the support surface of the backing roll, wherein the film is between the nip roll and the backing roll, wherein the flame of the burner is in contact with the film, wherein the burner is positioned such that the distance between an unimpinged flame tip of the flame and the burner is at least one-third greater than the distance between the film and the burner.

2. The apparatus of claim 1 further including a temperature-controlled shield attached to the frame adjacent the backing roll, wherein the temperature-controlled shield is positioned between the burner and the nip roll.

3. The apparatus of claim 1, wherein the nip roll includes an outer surface, and wherein the outer surface of the nip roll is temperature-controlled.

4. The apparatus of claim 3, wherein the outer surface of the nip roll is heated greater than 165° F. (74° C.) for pre-heating the film prior to the burner.

5. The apparatus of claim 4, wherein the outer surface of the nip roll is heated greater than or equal to 180° F. (82° C.) for pre-heating the film prior to the burner.

6. The apparatus of claim 1, wherein the angle measured between the burner and the nip roll is less than 45°, wherein a vertex of the angle is positioned at the axis of the backing roll.

7. The apparatus of claim 1 further comprising an air applicator attached to the frame adjacent the support surface for blowing air onto the support surface.

* * * * *

UNITED STATES PATENT AND TRADEMARK OFFICE

CERTIFICATE OF CORRECTION

PATENT NO. : 7,980,849 B2
APPLICATION NO. : 12/702907
DATED : July 19, 2011
INVENTOR(S) : Mark Anthony Strobel et al.

It is certified that error appears in the above-identified patent and that said Letters Patent is hereby corrected as shown below:

First Page, Column 2 (Other Publications)
Line 1, delete “Flim,” and insert -- Film, --, therefor.

Column 1
Line 67, delete “(1996)” and insert -- (1996). --, therefor.

Column 12
Line 25, delete “backing” and insert -- backing. --, therefor.

Column 16
Lines 21-37, delete “1. An apparatus for flame-perforating film, comprising: a frame;
a backing roll attached to the frame wherein the backing roll includes a support surface with a plurality of lowered portions;
a nip roll attached to the frame adjacent the backing roll a burner attached to the frame opposite the support surface, wherein the burner supports a flame, and wherein the flame includes a flame tip opposite the burner; and
a film contacting and wrapped around at least a portion of the support surface of the backing roll, wherein the film is between the nip roll and the backing roll, wherein the flame of the burner is in contact with the film, wherein the burner is positioned such that the distance between an unimpinged flame tip of the flame and the burner is at least one-third greater than the distance between the film and the burner.” and
insert -- 1. An apparatus for flame-perforating film, comprising:
a frame;
a backing roll attached to the frame wherein the backing roll includes a support surface with a plurality of lowered portions;
a nip roll attached to the frame adjacent the backing roll;
a burner attached to the frame opposite the support surface, wherein the burner Signed and Sealed this
Eighth Day of November, 2011

David J. Kappos
*Director of the United States Patent and Trademark Office* supports a flame, and wherein the flame includes a flame tip opposite the burner; and a film contacting and wrapped around at least a portion of the support surface of the backing roll, wherein the film is between the nip roll and the backing roll, wherein the flame of the burner is in contact with the film, wherein the burner is positioned such that the distance between an unimpinged flame tip of the flame and the burner is at least one-third greater than the distance between the film and the burner. --, therefor.